July 30, 1957
C. A. FROM, JR
2,800,811
METHOD OF MAKING A GAGE HAVING A HARD
NON-CONDUCTING GAGING SURFACE
Filed April 30, 1954
2 Sheets-Sheet 1
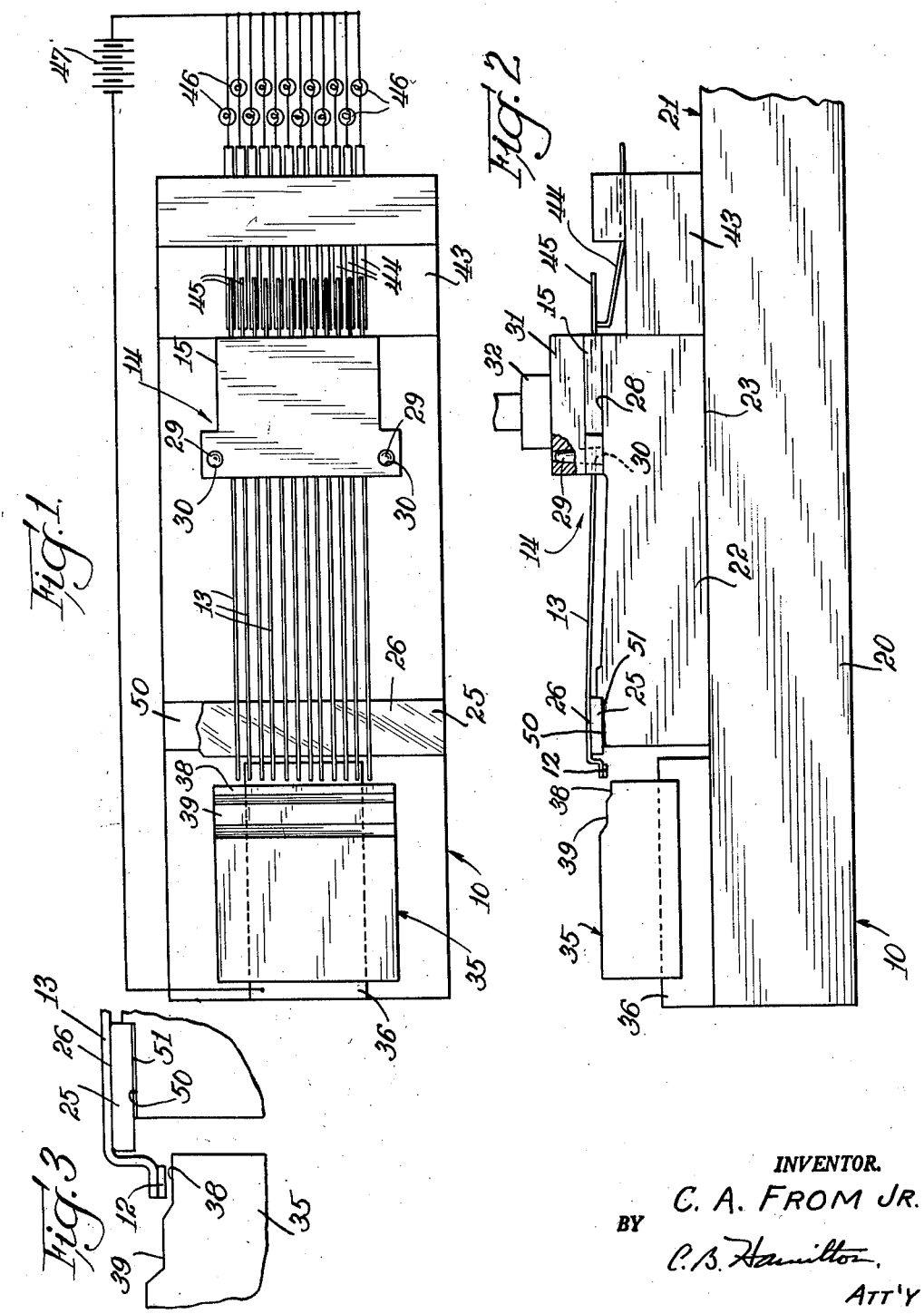
INVENTOR.
C. A. FROM JR.
BY
C. B. Hamilton
ATT'Y July 30, 1957  
C. A. FROM, JR  
2,800,811  
METHOD OF MAKING A GAGE HAVING A HARD  
NON-CONDUCTING GAGING SURFACE  
Filed April 30, 1954  
2 Sheets-Sheet 2
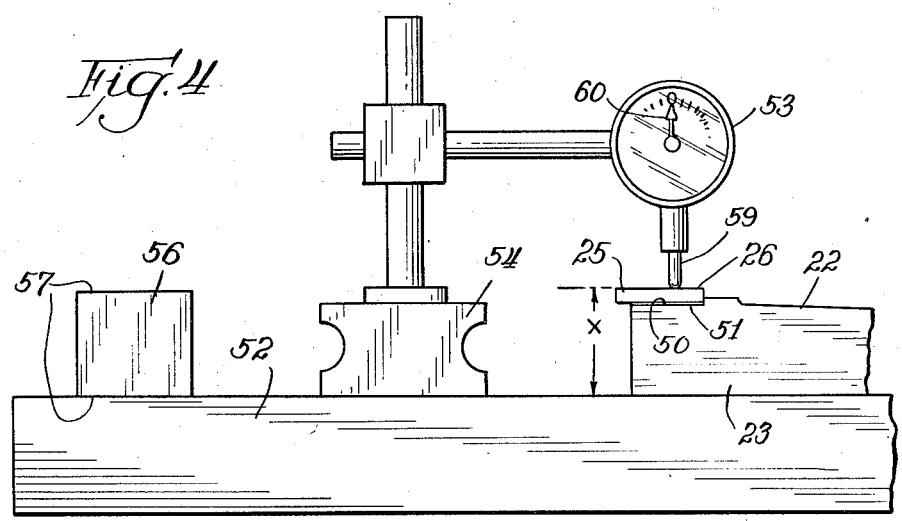
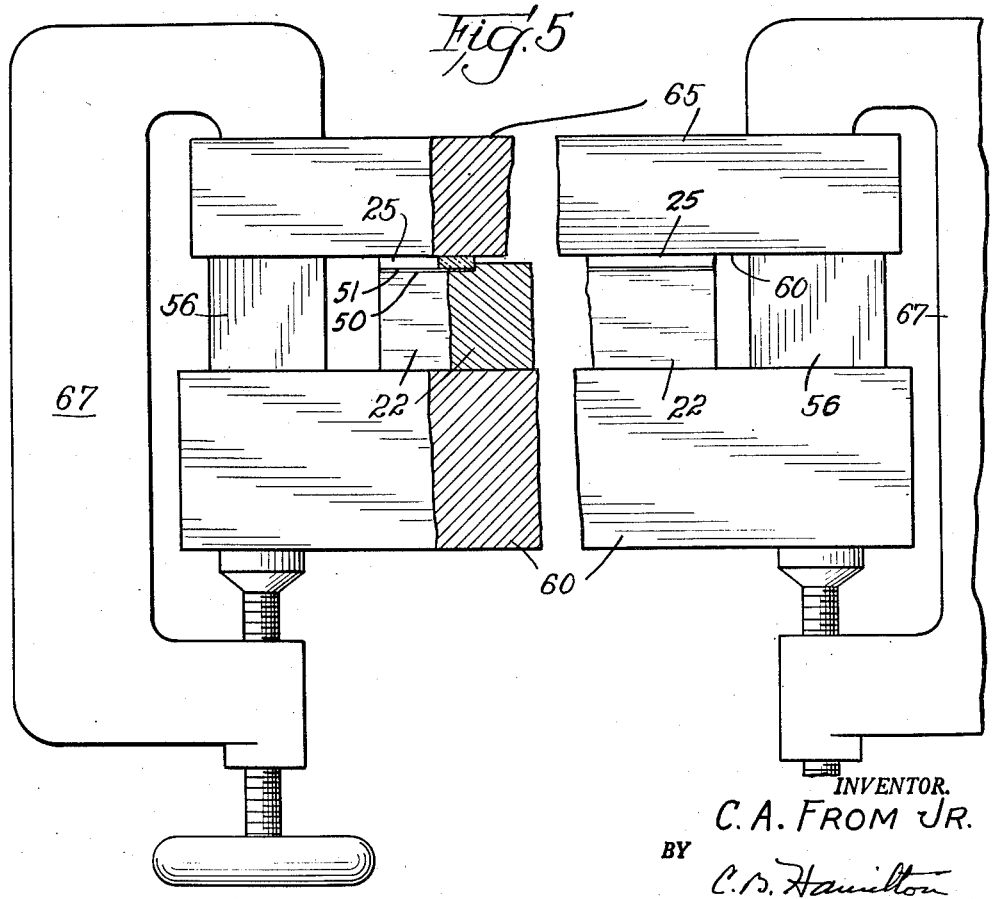
INVENTOR.  
C. A. FROM JR.  
BY  
C. B. Hamilton  
ATT'Y.

United States Patent Office 2,800,811
Patented July 30, 1957

2,800,811

METHOD OF MAKING A GAGE HAVING A HARD NON-CONDUCTING GAGING SURFACE

Charles A. From, Jr., Elmhurst, Ill., assignor to Western Electric Company, Incorporated, New York, N. Y., a corporation of New York Application April 30, 1954, Serial No. 426,867

5 Claims. (Cl. 76—101)

This invention relates to a method of making a gage having a hard non-conductive surface and more particularly to a method of bonding a flat sapphire to a metal holder to provide a gage component having a flat hard electrically non-conductive surface in parallel relation to a base surface of the holder and in predetermined spaced relation thereto.

An object of this invention is to provide an improved method of forming a gage element having a hard flat electrically non-conductive gaging surface disposed parallel to and spaced a precise predetermined distance from a flat base surface thereof.

A further object of the invention is to provide a method of bonding a flat sapphire to a metal holder to provide a gage component having a flat hard electrically non-conductive gaging surface in parallel relation to a flat base surface of the holder and in predetermined accurately spaced relation thereto.

A method illustrating the features of the invention as applied to the making of gage components having a hard, electrically non-conductive gaging surface in parallel relation to a base surface thereof and spaced a predetermined distance therefrom may include the steps of shaping a sapphire to a predetermined thickness with flat opposite faces parallel to each other, shaping a metal holder with a flat base surface and a sapphire supporting surface parallel thereto and spaced therefrom a distance equal to said predetermined distance minus the thickness of said sapphire and a predetermined distance for adhesive, applying to one side of said sapphire and to the sapphire supporting surface of said holder a layer of adhesive, pressing the sapphire onto the supporting surface of the holder to a predetermined position with the upper face of the sapphire parallel to and spaced said predetermined distance from the base surface of the holder, and curing the adhesive to bond the sapphire to the holder.

Other objects and advantages of the invention will become apparent by reference to the following detailed description and the accompanying drawings illustrating a preferred embodiment thereof, in which Figs. 1 and 2 are plan and side elevational views, respectively, of a gaging device for gaging the position of contact elements formed on the ends of a plurality of wires of a switch part;

Fig. 3 is an enlarged fragmentary view of a portion of the gaging device shown in Fig. 1;

Fig. 4 is an elevational view of devices used in one method of making a gage component of said gaging device; and Fig. 5 is an elevational view with parts in section of devices used in another method of making said gage component.

Referring to Figs. 1 and 2 of the drawings, 10 indicates a gaging device for checking the offset relation of contacts 12 secured to the Z-shaped ends of a plurality of parallel wires 13 of a switch part 14 which has a block 15 of insulating material molded around the wires for supporting them in a row in a predetermined laterally spaced relation to each other.

The gaging device 10 comprises a flat rectangular base 20 having a flat upper surface 21 ground thereon. A rectangular metal member or holder 22 provided with a ground flat base surface 23 is secured on the base 20 and has a slab 25 of sapphire or other hard electrically non-conductive material bonded thereto at its upper left-hand corner as viewed in Fig. 2 to provide a flat horizontal gaging surface 26 for supporting the end portions of the wires 13 of the switch part. The holder 22 has a flat surface forming a seat 28 for supporting the block 15 of the switch part, and the holder has a pair of aligning pins 29 engageable in a pair of apertures 30 in the block 15 for aligning the switch parts in a predetermined position on the holder 22. An apertured pressure block 31 is adapted to be placed on the block 15 of the switch part and pressure applied thereto by a pressure device including a plunger 32 to hold the block and the wires 13 of the switch part against the seat 28 and the gaging surface 26, respectively.

Adjacent one end of the holder 22, a slidable gage block 35 having a flat rectangular recess is slidably mounted on a flat rectangular rail 36 for movement parallel to the upper surface 21 of the base 20. The gage block 35 has a pair of horizontal gaging surfaces 38 and 39 for gaging the positions of the contacts 12 on the wires 13. The gaging surfaces 26, 38, and 39 are all disposed in parallel planes which are spaced predetermined distances from each other and from the upper surface 21 of the base 20. At the opposite end of the holder 22 is mounted a block of electrical insulating material 43 for supporting a plurality of contact spring members 44, the end portions of which are adapted to engage the end portions of the wires 13. Each contact spring 44 has a lamp 46 electrically connected thereto and to a battery 47 which is grounded to the base 22.

The gage member 35 is adapted to be moved into a first position with the horizontal gaging surface 38 disposed below the row of contacts 12 and in this position the properly aligned contacts 12 are disposed above and in spaced relation to the gaging surface 38. In the event that the Z-shaped end of a wire 13 is improperly formed and disposed below its proper position, the contact 12 thereon will engage the member 35 and complete an electrical circuit through the wire 13 and the lamp 46 associated therewith to indicate this condition. The gage 35 may then be moved to a second position with the horizontal gaging surface 39 disposed below the row of contacts 12 in which position the properly oriented contacts 12 are in engagement with the gaging surface 39 and the lamp circuits associated therewith are completed and the lamps 46 lit to indicate this condition while those contacts which are disposed above their proper position will be out of engagement with the gage block 35 and the light associated therewith will not be illuminated.

One of the main features of the present invention is the method of bonding and positioning the sapphire slab 25 on the holder 22 to obtain a flat electrically non-conductive gaging surface 26 in parallel relation to the base surface 23 of the holder and at a predetermined precise distance "X" therefrom and to effect this result with the elimination of the need for grinding and polishing the gaging surface 26 after fabrication. This is accomplished by shaping a synthetic sapphire into a slab 25 of rectangular cross section and of a predetermined thickness with a pair of flat opposed faces spaced apart a predetermined distance. The holder 22 has a flat surface or seat 50 for the sapphire, which seat is accurately ground in parallel relation to the base surface 23 and spaced therefrom a distance equal to the predetermined distance "X" minus the thickness of the sapphire slab 25 and an additional 0.0003", for a layer of bonding adhesive 51.

After the seat 50 has been accurately ground on the holder 22, the holder is applied to the upper flat surface of a surface plate 52 as shown in Fig. 4 and a thin uniform layer of the adhesive 51 is applied to the seat 50 and to the lower face of the sapphire slab 25 and the slab placed onto the seat 50. The layer of adhesive 51 thus formed between the sapphire 25 and the holder 22 is thicker than the desired final thickness to support the sapphire 25 with the gaging surface 26 above its desired final position.

The position of the gaging surface 26 of the sapphire relative to the base surface 23 of the holder is measured by a dial gage 53 adjustably mounted on a surface gage 54 which is slidable on the surface plate. A standard or master gage block 56 is provided having a pair of opposed flat parallel surfaces 57 spaced apart a distance equal to the desired distance "X" between the gaging surface 26 and the base surface 23. With the plunger 59 of the dial gage in engagement with the upper surface 57 of the standard gage block 56, the pointer 60 of the dial gage may be set at zero, after which the dial gage may be moved into the position shown in Fig. 4 with the plunger 59 in engagement with the gaging surface 26 of the sapphire slab 25 to indicate its position.

The dial gage 53 is then removed and pressure is applied to the upper surface of the sapphire slab 25 by hand or other means to reduce the thickness of the adhesive 51 and to position the gaging surface 26 at the proper distance from the base surface 23 of the holder 22 and in parallel relation thereto. After each application of pressure to the sapphire slab 25, the dial gage 53 is used to check its position, and this process of applying pressure to the slab 25 where needed and checking its position is carried on until the gaging surface 26 is finally positioned at its proper distance "X" from the base surface 23 and in parallel relation thereto. The holder 22 with the sapphire 25 properly positioned thereon is then put in a place where it will not be disturbed and the adhesive 51 is allowed to cure and effect a strong bond between the sapphire slab 25 and the metal holder 22.

An adhesive for effectively bonding the sapphire to the metal base may be made from the epoxy type resins, as for example, resins made by the condensation of ethylene chlorhydrin and bisphenols. The epoxy type of adhesive has a low coefficient of shrinkage, approximately 3%, so that during shrinkage of the 0.0003" layer of adhesive 51, a negligible movement of approximately 0.000009" is imparted to the sapphire.

Another method of applying the sapphire 26 to the holder 22 to position the gaging surface 26 in parallel relation to the base surface 23 of the holder and at said predetermined distance "X" therefrom as illustrated in Fig. 5. After the adhesive has been applied to the underneath side of the sapphire slab 25 and to the seat 50 of the holder 22, and the slab 25 applied to the seat, the holder 22 with the slab 25 applied thereto is placed on the flat upper face of a surface plate 60 as shown in Fig. 5. On each side of the holder 22 are positioned master gage blocks 56 in alignment with the sapphire slab 25, and a pressure transmitting bar 65 having a flat face 66 is placed on the sapphire slab 25 with the end portions of the bar disposed above the gages 56. Clamps 67 are then applied to the ends of the bar 65 and tightened to move the bar 65 toward the surface plate 60 until it is stopped by the gage blocks 56, which movement of the bar 65 toward the surface plate 60 moves the sapphire slab 25 relative to the holder 22 to accurately position the upper gaging surface 26 of the sapphire slab in parallel relation to the base surface 23 of the metal holder 22 and at said predetermined distance "X" therefrom. During the movement of the sapphire slab 25 relative to the holder 22 the adhesive 51 is squeezed to its proper thickness (0.0003"). The adhesive is then allowed to cure and bond the sapphire 25 to the holder.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making a gage component having a flat base surface and a hard, flat, electrically non-conductive gaging face parallel to and spaced a predetermined distance from said base surface which comprises shaping a slab of relatively hard electrically non-conducting material to a predetermined thickness with flat opposed faces in parallel relation to each other, shaping a metal holder with a flat base surface and a flat seat parallel to said base surface and spaced therefrom a distance equal to said predetermined distance minus the thickness of said slab and a predetermined distance for a layer of adhesive, applying a layer of adhesive onto said seat, pressing the slab onto the adhesive on the seat of said holder to a predetermined position with one face of the slab parallel to the base surface of said holder and spaced said predetermined distance therefrom, and curing the adhesive to bond the slab to the holder.

2. A method of making a gage component having a flat base surface and a hard, flat electrically non-conductive gaging face parallel to and spaced a predetermined distance from said base surface which comprises shaping a sapphire to a predetermined thickness with flat opposed faces in parallel relation to each other, shaping a metal holder with a flat base surface and a flat sapphire supporting surface parallel to said base surface and spaced therefrom a distance equal to said predetermined distance minus the thickness of said sapphire and a predetermined distance for a layer of adhesive, applying a layer of adhesive to the supporting surface and to one side of said sapphire, pressing the sapphire onto the supporting surface of said holder to a predetermined position with one face of the sapphire parallel to and spaced said predetermined distance from the base surface of said holder, and curing the adhesive to bond the sapphire to the holder.

3. A method of making a composite gage element having a flat base surface and a hard, flat electrically non-conductive surface parallel to and spaced a predetermined distance from said base surface which comprises shaping a slab of relatively hard electrically non-conducting material to a predetermined thickness with flat opposed faces in parallel relation to each other, shaping a metal supporting member with a flat base surface and a flat seat parallel to said base surface and spaced therefrom a distance equal to said predetermined distance minus the thickness of said slab and a predetermined distance for a layer of adhesive, applying onto said flat seat and one side of said slab a layer of adhesive such as the epoxy type resins made by the condensation of ethylene chlorhydrin and bisphenols, pressing the slab onto the seat of said metal member to a predetermined position with one face of the slab parallel to the base surface of said metal member and spaced said predetermined distance therefrom, and curing the adhesive to bond the slab to the holder.

4. A method of making a composite gage element having a flat base surface and a hard, flat electrically non-conductive gage surface parallel to and spaced a predetermined distance from said base surface, which comprises shaping a slab of relatively hard electrically non-conductive material to a predetermined thickness with flat opposite faces in parallel relation to each other, shaping a metal supporting member with a flat base surface and a flat seat parallel to said base surface and spaced therefrom a distance equal to said predetermined distance minus the thickness of said slab and a predetermined distance for a layer of adhesive, applying a layer of adhesive onto said seat, placing the slab onto the adhesive on the seat of said holder, placing the metal member with the slab thereon onto a surface plate and measuring the distance of the upper surface of the slab from the base surface of the holder, alternately applying pressure to the slab where necessary to squeeze out some of the adhesive and measuring the position of the upper surface of the slab to bring it into parallel relation with said base surface and said predetermined distance therefrom, and curing the adhesive to bond the slab to the metal member.

5. A method of making a composite gage element having a flat base surface and a hard, flat electrically non-conductive gage surface parallel to and spaced a predetermined distance from said base surface, which comprises shaping a slab of relatively hard electrically non-conductive material to a predetermined thickness with flat opposite faces in parallel relation to each other, shaping a metal supporting member having a flat base surface and a flat seat parallel to said base surface and spaced therefrom a distance equal to said predetermined distance minus the thickness of said slab and a predetermined distance for a layer of adhesive, applying a layer of adhesive onto said seat, placing the slab onto the adhesive on the seat of said metal member, placing the metal member with the slab thereon onto a surface plate, placing on the surface plate adjacent the ends of said slab a pair of gage blocks having opposed flat parallel faces spaced apart an extent equal to said predetermined distance, placing a bar with a flat surface onto the upper surface of said slab, moving the bar toward the surface plate until it engages said gage blocks to cause the bar to push the slab against the adhesive to a predetermined position relative to the holder with the upper face of the slab parallel to and spaced said predetermined distance from the base surface of the metal member, and curing the adhesive to bond the slab to the metal member.

References Cited in the file of this patent

UNITED STATES PATENTS

| | | |
|---|---|---|
| 1,110,428 | Edison | Sept. 15, 1914 |
| 1,329,370 | Coleman | Feb. 3, 1920 |
| 1,903,077 | Wolf | Mar. 28, 1933 |
| 2,414,231 | Kraus | Jan. 14, 1947 |
| 2,493,233 | Dower | Jan. 3, 1950 |